United States Patent [19]

Weber

[11] 4,409,829
[45] Oct. 18, 1983

[54] VOLUME FLOW SENSOR OF THE GEAR WHEEL MOTOR TYPE

[75] Inventor: Werner Weber, Werdohl, Fed. Rep. of Germany

[73] Assignee: Kracht Pumpen-und Motorenfabrik GmbH & Co. KG, Werdohl, Fed. Rep. of Germany

[21] Appl. No.: 325,019

[22] Filed: Nov. 25, 1981

[30] Foreign Application Priority Data

Nov. 27, 1980 [DE] Fed. Rep. of Germany ....... 3045043

[51] Int. Cl.$^3$ ............................ G01F 3/10; G01F 15/00
[52] U.S. Cl. .................................. 73/261; 73/861.78; 324/174; 336/135
[58] Field of Search ................. 73/261, 861.77, 861.78; 324/173, 174, 208; 336/135

[56] References Cited

U.S. PATENT DOCUMENTS 3,166,936 1/1965 Fisher et al. ...................... 73/861.77

OTHER PUBLICATIONS

V. von Borcke, "Fieldplate Sensor FP212L100: Construction, Operation and Applications", Bauelem. Electrotechnik, vol. 12 (9/1977), pp. 100–106.

*Primary Examiner*—E. R. Kazenske
*Assistant Examiner*—John E. Chapman, Jr.
*Attorney, Agent, or Firm*—Gottlieb, Rackman & Reisman

[57] ABSTRACT

A volume flow sensor of the gear wheel motor type having a pair of circular gear wheels which are mounted in a housing on fixed axles by means of ball bearings and without wall contact so as to rotate freely. At least one non-magnetic inset is positioned within the housing in the region of the teeth of one of the gear wheels. The inset has two poles of a material of good magnetic conductivity passing through it, the ends of the poles nearer to the gear wheel are situated substantially on the same gear wheel diameter and the other ends of the poles are positioned adjacent a field plate differential sensor. In order to produce useful signals from which reliable counting pulses can be derived, even with broad teeth, in particular with teeth of module greater than 3, the poles are arranged in the inset with their ends separated in such a way that the ends of the poles adjacent the gear teeth are at a greater distance from one another than are the other ends adjacent the plates of the field plate differential sensor. The poles may be in the form of pins which, starting from the end surface of the inset nearer to the field plate differential sensor, lead through the inset with oppositely directed slopes. It is also possible to make the poles from a plurality of pole elements, the inner elements of which are pole pins arranged at right angles to the end surface of the inset adjacent the gear teeth and which engage with pole pins extending from the peripheral edge of the inset.

8 Claims, 7 Drawing Figures

VOLUME FLOW SENSOR OF THE GEAR WHEEL MOTOR TYPE

FIELD OF THE INVENTION

The invention relates to a volume flow sensor of the gear wheel motor type, having a pair of circular gear wheels which are mounted in a housing to rotate freely on fixed axles without contact with the walls of the housing, in which there is provided at least one non-magnetic inset, having two poles consisting of a material of substantial magnetic conductivity and passing through the inset from one end surface thereof to the other, the ends of the poles at one end surface of the inset being adjacent the teeth of one of the gear wheels and situated substantially on the same gear wheel diameter and the ends of the poles at the other end of the inset being positioned adjacent the field plates of a field plate differential sensor.

Each time a tooth passes the field plate differential sensor, a signal in the form of a sine wave having a positive and a negative phase is generated by said differential sensor, a pulse being derived from each said signal, the pulses then being registered by a pulse counter. Each pulse corresponds to a quantity of liquid having the magnitude of the geometric volume of a tooth.

DESCRIPTION OF THE PRIOR ART

Standard field plate differential sensors have two field plates each having a plate surface of $1 \times 2$ mm. These field plates are situated with their longer sides parallel to each other at a separation distance of 0.7 mm.

The poles designed as pole pins are situated parallel to one another within the non-magnetic inset. The pole pins are tapered or stepped in order to sustain high internal pressure of up to 400 bar. Here they have a diameter of 2.2 mm. at their inner ends and a diameter of 1.0 mm. at their upper ends with a mean separation distance of 2.2 mm.

Volume flow sensors of the known type generate usable sine wave signals up to a tooth size of about module 3. For volume flow sensors having gear wheels of greater modules, marked disturbances of the sine curve are produced with sections of the curve having a gradient of an acute angle to the null line in the region of the null transit. Clean pulses cannot be derived from such distorted sine curves. In addition a marked deviation from the cycle ratio 1:1 is also produced.

It is an object of the invention to design a volume flow sensor of the type referred to hereinbefore in such a way that, even for gear wheels having a module greater than 3, a usable signal is produced by the differential field plate sensor on the passage of a tooth.

SUMMARY OF THE INVENTION

This object is solved according to the invention in that the poles are arranged in the inset with the ends of the poles which pass through said one end surface of the inset being at a greater distance apart then the ends of the poles which pass through said other end surface of the inset.

In one convenient form of volume flow sensor in accordance with the invention, the poles may be pins of circular cross-section having their longitudinal axes inclined to the longitudinal axis of said inset thereby passing through both end surfaces of said inset in a penetration ellipse, the longer axes of said penetration ellipses in said other end surface of said inset being substantially parallel to one another and their shorter axes being in substantial alignment one with the other. The longer axes of said penetration ellipses in said one end surface of the inset may be in substantial alignment one with the other.

In other embodiments of volume flow sensor in accordance with the invention, each of the poles may comprise a plurality of pole elements in magnetically-conducting connection one with another.

For example in one embodiment each pole comprises a first pole element in the form of a pin which is arranged in a bore extending within the inset and at its outer end passes through said other end surface of said inset obliquely to the longitudinal axis of said inset to form a penetration ellipse in said other end surface, the two penetration ellipses formed in said other end surface by said oblique bores having their longer axes substantially parallel with one another and their shorter axes in substantial alignment, and a second pole element in the form of a pin in a bore extending in said inset from said one end surface of said inset to the corresponding said oblique bore in a direction substantially perpendicular to said one end surface of said inset, said second pole elements being substantially symmetrical with respect to said longitudinal axis of said inset and each said second pole element making a magnetically-conducting connection with the respective said first pole element.

Alternatively in another embodiment each pole comprises a first pole element in the form of a pin which extends through a first bore in said inset in a direction parallel to the end surfaces of said inset, a second pole element also in the form of a pin extending in a second bore in said inset from said one end surface of said inset substantially perpendicularly to said one end surface and engaging the respective first pole element said second elements being substantially symmetrical with respect to the longitudinal axis of said inset, and a third pole element extending in said inset from said other end surface of said inset substantially perpendicularly to said other end surface and also engaging the respective first pole element, each respective said second and third pole element making magnetically-conducting connections with the respective said first pole element. Each third pole element may be in the form of a pin arranged in a bore extending from said other end surface and penetrating the respective said first pole element. Alternatively, said other end surface of the inset may contain a sunk bore in a central region thereof extending to both said first bores in which said first pole elements are located and each said third pole element may have a substantially rectangular cross-section and be positioned adjacent each other side-by-side, but separated one from the other by a non-magnetic intermediate layer, in said sunk bore, each said third pole element making a magnetically-conducting connection with the respective said first pole element.

In these solutions according to the invention, the basic breadth of the field plate differential sensor which is determined by the distance between the ends of the poles at said one end surface of the inset is increased significantly beyond the distance given by the known arrangement of the poles. It is possible by this means to attempt exact adjustment to the breadth of the tooth. The mean separation between the ends of the poles at said one end surface of the inset should correspond approximately to the breadth of the tooth at the scanning diameter. By means of the arrangement of the poles according to the invention it is also possible to decrease the distance between the ends of the poles at said other end surface of the inset to such an extent that it corresponds to the separation of the field plates. Thus there is brought about a considerably improved overlap of the field plates by the ends of the poles at said other end surface of the inset and an increase in sensitivity.

BRIEF DESCRIPTION OF THE DRAWINGS

Several embodiments of volume flow sensors in accordance with the invention are now described by way of example with reference to the accompanying drawings, in which.

DESCRIPTION OF THE PREFERRED EMBODIMENTS

Figure 1:
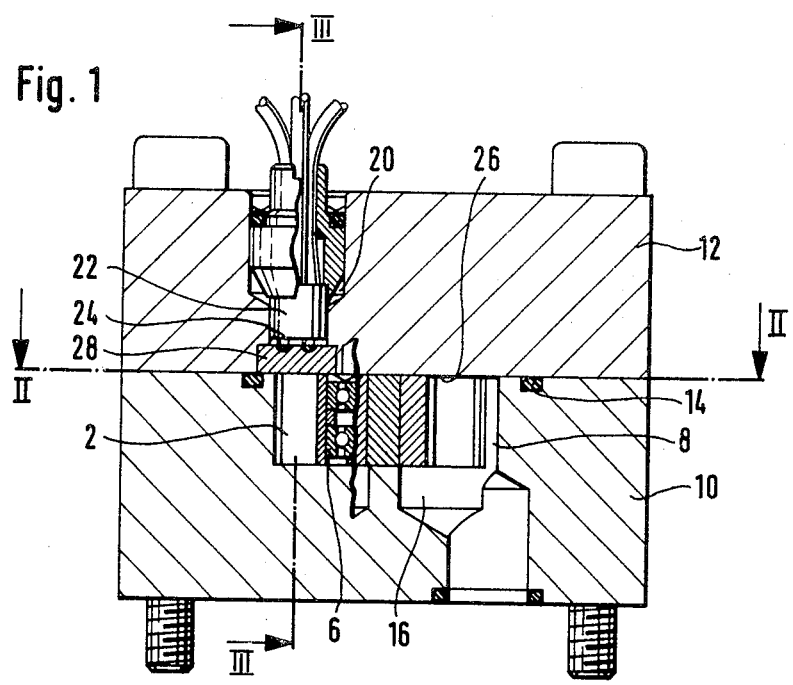
FIG. 1 is a section along the line I—I in FIG. 2 through the first embodiment of volume flow sensor.
Figure 2:
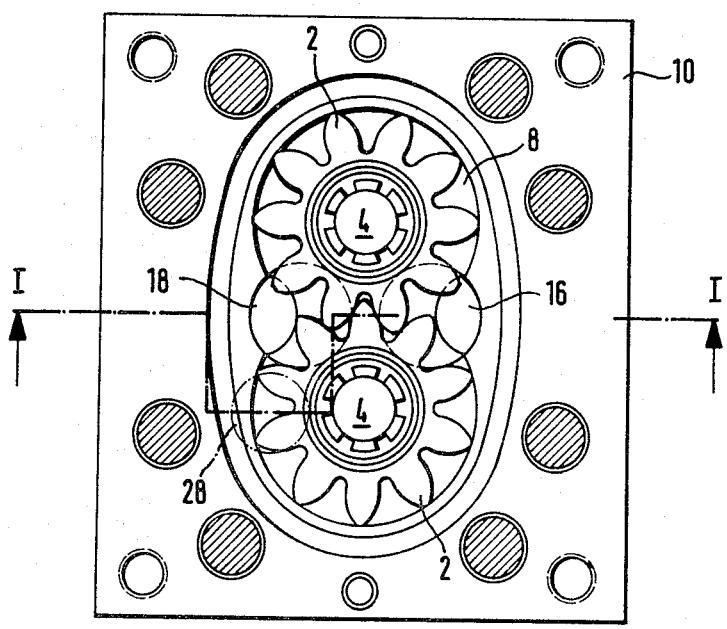
FIG. 2 is a section along the line II—II in FIG. 1.

The volume flow sensors illustrated in the drawings are each of a gear wheel motor type and each has a pair of gear wheels 2 meshing with one another and which are mounted on fixed axles 4 by means of ball bearings 6 within the chamber 8 in which they rotate freely without contact with the walls of the chamber 8. The chamber 8 is formed in the example shown in FIGS. 1 and 2 in a lower housing part 10, closed by a cover 12. A seal 14 is arranged between the two parts of the housing. In the housing there are two bores 16 and 18 at a distance from one another which respectively serve as an inlet and an outlet through which liquid enters and leaves the front or upper face 26, as shown, essentially parallel to the axis of rotation of the gear wheels 2.

In the cover 12 there is a bore 20 in which there is a field plate differential sensor 22 of a known constructional type which carries two field plates at its lower end 24. An inset 28 of a non-magnetic material is set into the housing cover 12 adjacent the front or upper face 26 of the chamber 8, the inset 28 may be a circular plate of aluminium or another non-magnetic material situated coaxially with the bore 20.

Figure 4:
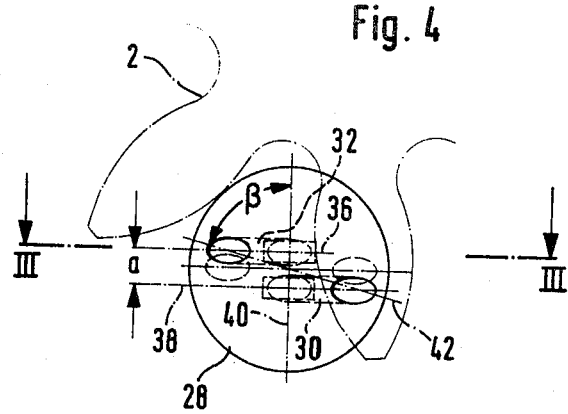
FIG. 4 is a section along the line IV—IV in FIG. 3.
Figure 3:
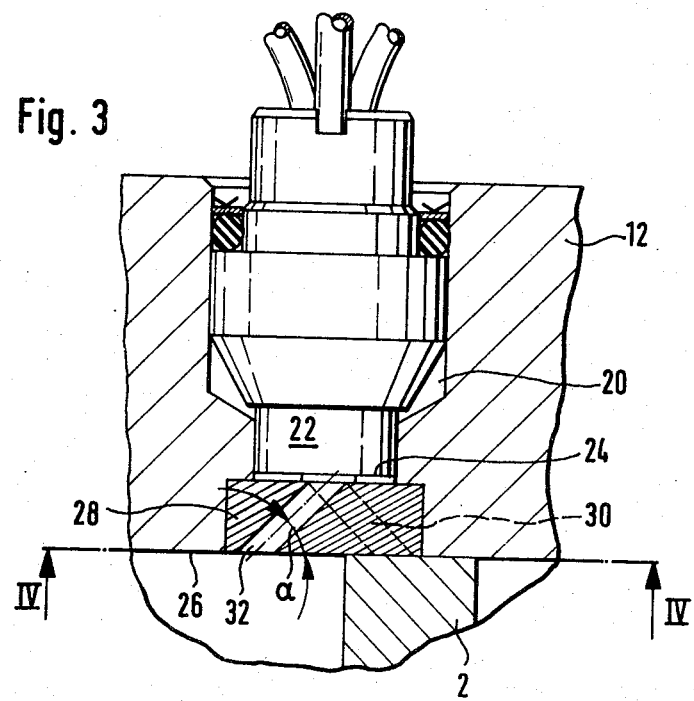
FIG. 3 is a section along the line III—III in FIG. 1.

In the inset 28 there are, as can be seen in FIGS. 3 and 4, two pole pins 30, 32 arranged at a distance from one another and which slope at an angle $\alpha$ to the common axis of the inset 28 and the field plate differential sensor 22. The angle of slope $\alpha$ may, for example, be 45°. The pole pins 30 and 32 are arranged in two planes 36, 38 situated at a distance a from one another. In this embodiment the planes are substantially parallel to one another. In such an arrangement the pole pins have elliptical cross-sections where they pass through the end surfaces of the inset 20. At the upper end surface (as shown) adjacent the field plates 24, the ellipses lie with their longer axes parallel to one another and the middle points of the ellipses lie on a line 40 which extends substantially at right angles to the planes 36 and 38 i.e., the shorter axes of the ellipses are in alignment. The pole pins 30 and 32 can be tapered or stepped in a known manner in order to transmit the internal pressure of the volume flow sensor to the inset 28. Such an offset section is not shown in the drawings. In the arrangement described the least separation a of the pole pins 30, 32 which it is possible to achieve no longer depends on the largest diameter of the pole pins. It is therefore possible to adapt to a large extent the mean separation a of the pole pins 30, 32 at their upper ends adjacent the field plates 24 to the mean separation of the field plates of the field plate differential sensor. With a pole pin diameter of 1.5 to 1.6 mm. in this region it is possible to adjust exactly to a mean separation corresponding to the mean separation, 1.7 mm., of normal commercial field plate differential sensors. The penetration ellipses of the pole pins 30 and 32 at the upper (as shown) end surface of the inset 28 thus cover the field plate surfaces to a large extent so that the magnetic flux can be transmitted from the sensor to the pole pins with a high degree of efficiency.

In the arrangement of the pole pins 30, 32 as described so far, the connection line 40 between the centers of the pole pins at their upper ends is situated so as to be offset by an angle $\beta$ to the connecting line 42 through the centres of the pole pins at the lower ends of the pole pins. The inset 28 must therefore be so inserted into the housing cover 12 that the two pole pins 30,32 are situated substantially on the same diameter of the gear wheel 2 in the region of its teeth, preferably on the pitch circle of the gear wheel. A certain asymmetry is produced here which can, however, lead to only a slight distortion of the sine wave signals generated. Completely symmetrical relationships can be achieved if the planes in which the pole pins 30, 32 are situated are arranged to slope relative to one another in such a way that the longer axes of the ellipses are aligned with one another at the lower ends of the pole pins, as is shown in FIG. 4 in broken lines. With a circular inset, the ellipses at the lower ends of the pole pins 30, 32 then have their longer axes on one diameter of the inset 28 and the ellipses at the upper ends of the pole pins 30,32 have their shorter axes on another diameter of the inset 28 at an angle of 90° relative to said one diameter. The angle $\beta$ is then 90°.

With an arrangement of pole pins 30, 32 in the manner described good sine wave signals are generated by the field plate differential sensor, even with broad teeth, for example having a module of 7, so as to make a reliable formation of pulses possible. With pole pins sloping at an angle $\alpha = 45°$ and a thickness of 6 mm. for the inset, a spread of 6 mm. can be achieved at the base of the pole pin, that is a mean distance between the inner ends of the pole pins 30, 32 of 10.5 mm. a separation greater than the mean tooth breadth of a tooth of module 7, which is 9.63 mm. By selection of the angle of slope $\alpha$ it is possible to achieve an exact adjustment of the base of the pole pin to the breadth of the tooth for any tooth breadth.

Figure 5:
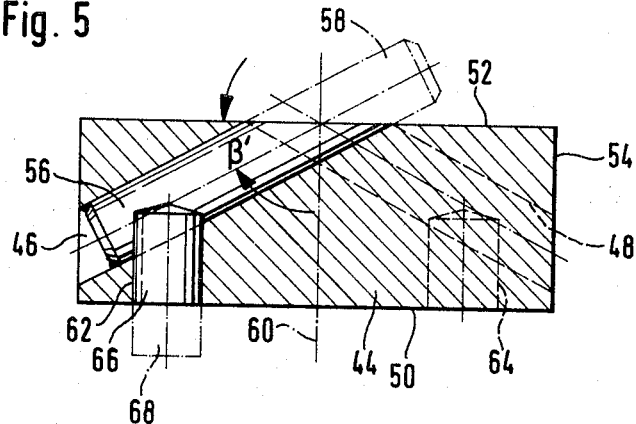
FIG. 5 is a section along the line III—III in FIG. 4 of another embodiment of volume flow sensor.

In the embodiment shown in FIG. 5, two bores 46, 48, sloping in opposite directions are arranged in the inset 44. The axes of the bores 46, 48 are arranged at an angle $\beta'$ to the surface 52 (i.e., the upper surface, as shown) situated parallel to the lower end surface 50, so that they pass through the peripheral edge 54 of the insert 44. Pole pins 56 are arranged in these sloping bores, in each case, and may be cemented into the respective bores 46, 48. The pole pins 56 may, as illustrated, be cylindrical pins, where the lower ends are situated radially inwards of the penetration surface of the sloping bores in the peripheral edge 54 of the inset 44. The end 58 of the pole pin which passes through the upper end surface 52 is finished so that a penetration ellipse is formed at the upper end surface 52 of the inset 44, as in the embodiment according to FIGS. 3 and 4.

Extending upward, as shown, from the lower end surface 50 of the inset 44 there are bores 62, 64 symmetrical with respect to the center line 60 of the inset 44 and which penetrate the sloping pole pins 56 or cut into them. Cylindrical pole pins 66 are inserted into the bores 62, 64 and are fixed by cementing. The projecting ends 68 of the pole pins 66 are finished flush with the lower end surface 50 of the inset. This may, for example, take place following the insertion of the inset into the housing cover 12 and during the finishing of lower face 26 of the latter. The pole pins 56 may, of course, alternatively be fixed in the bores by force fit.

In contrast to the embodiment shown in FIGS. 3 and 4, in which the pole pins also form a penetration ellipse on the lower face (as shown) of the inset, in the embodiment shown in FIG. 5, the lower face of the pole pin 66 is circular. This embodiment produces an advantage in manufacturing as the sloping pole pins can always be arranged at the same angle whereas the position of the lower pole pins can be arranged at different distances to correspond with requirements of flow sensors with gear wheels with tooth sizes of different modules. Since the outer pole pins 56 arranged at an angle are no longer acted upon in the axial direction by the fluid pressure in the volume flow sensor, they may be constructed without offset even at high internal pressure in the sensor. The inner pole pins 66, acted on by the internal pressure, are supported in the base in the blind bores 62, 64 and are secured against displacement in this way.

Figure 6:
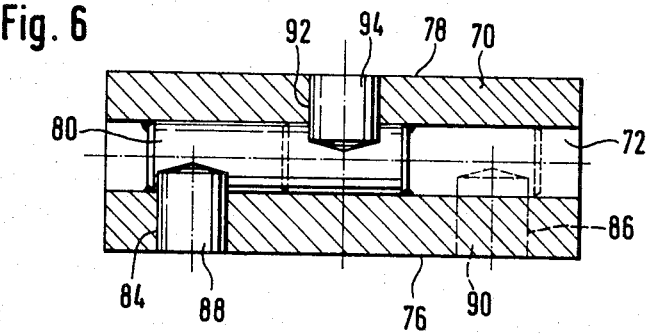
FIG. 6 is a section along the line VI—VI in FIG. 7, and shows one of the alternative embodiments below the horizontal centre-line thereof.
Figure 7:
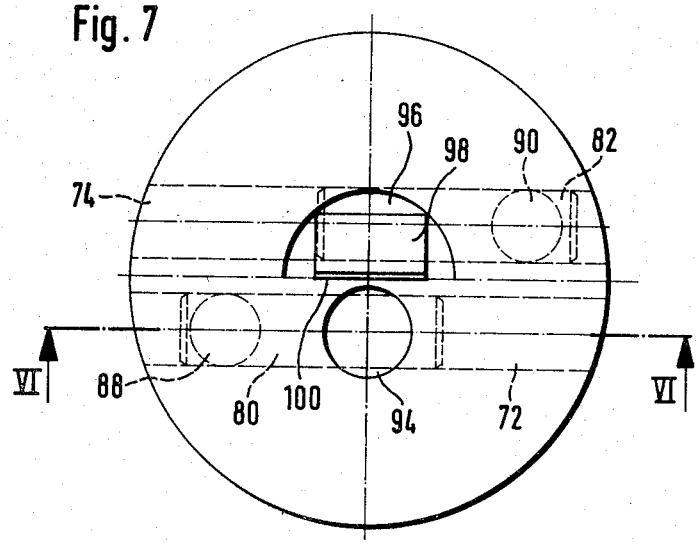
FIG. 7 is a plan view of a non-magnetic inset having two other alternative embodiments of volume flow sensors shown below and above the horizontal centre line.

Two further alternative embodiments are illustrated in FIGS. 6 and 7. In the embodiments, the inset 70 is provided with two parallel bores 72, 74 which extend substantially parallel to the end surfaces 76 and 78 of the inset 70. The bores 72 and 74 may be formed as blind bores. However they preferably extend, as is shown in the drawing, right through the inset 70. In the embodiment illustrated in FIGS. 6 and 7, by way of example, pole pins 80, 82 are inserted into the bores 72 and 74 from opposite ends thereof and are fixed in the bores by cementing. Starting from the lower end surface 76 (as shown) there are provided, as in the embodiment shown in FIG. 5, blind bores 84, 86 which penetrate the pole pins 80 and 82. Cylindrical pole pins 88, 90 are mounted in these bores so as to form a seal.

In the embodiment shown in FIG. 6 and in the part of FIG. 7 below the horizontal centre line therein bores 92 are provided, which again penetrate the pole pins, in the centre of the inset 70 on a line at right angles to the axes of the pole pins 80, 82. Cylindrical pole pins 94 are mounted in these bores and are fixed to form a seal.

In the embodiment described with reference to FIG. 6 and the lower part of FIG. 7, the penetration ellipse is absent in the upper end surface 78. The penetration ellipse resulted, in the embodiments shown in FIGS. 1 to 4 and FIG. 5, in an advantageous overlap of the field plates of the field plate differential sensor. However in the embodiment shown in FIG. 6 and the lower part of FIG. 7 an equivalent effect can be achieved in that a correspondingly larger diameter is chosen for the pole pin 94. Such a large diameter is easily possible since the pole pin 94 is not subjected to any pressure.

Since the region in which the external pole pins 94 are situated is free from pressure, another embodiment is also possible by means of which an overlap of the field plates is possible and which is as equally efficient as that produced by the penetration ellipse described hereinafter. Such an embodiment is shown in FIG. 7 above the horizontal centre line therein. Here, extending from the upper surface 78, there is a central sunk bore 96 which intersects the horizontal pole pins 80 and 83 at a plane base surface. It is then possible, for example, to insert pole pins 98 of rectangular cross-section in this bore. The pole pins 98 may subsequently be cemented in the blind bore. The two pole pins 98 may in this case be cemented by means of a non-magnetic intermediate layer 100 so that both pole pins can be inserted as a single constructional element. The non-magnetic intermediate layer 100 may have a thickness corresponding exactly to the distance between the field plates and the rectangular cross-section of the pole pins 98 to correspond with the cross-section of the field plates. The diameter of the sunk bore 96 is here preferably so chosen that it forms the circumscribing circle for the pole pin element with non-magnetic intermediate layer so that the pole pin element is centred in the sunk bore 96. The dimensions may be chosen so that a clamping effect is produced whereby cementing can be eliminated.

What I claim as my invention and desire to secure by Letters Patent of the United States is:

1. A volume flow sensor of the gear wheel motor type having a pair of circular gear wheels which are mounted in a housing therefor to rotate freely in fixed axles without contact with walls of said housing and at least one non-magnetic inset in a part of said housing in the region of the teeth of one of said gear wheels, said inset having two poles of substantial magnetic conductivity extending through said inset from one end surface thereof to the other, the ends of the poles at one end surface of said inset being adjacent said gear wheel teeth and situated substantially on the same diameter of said gear wheel and the ends of the poles at the other end surface of said inset being adjacent field plates of a field plate differential sensor, said poles arranged in said inset with the ends of said poles which pass through said one end surface of said inset being at a greater distance apart than the ends of said poles which pass through said other end surface of said inset.

2. A volume flow sensor according to claim 1 in which said poles are pins of circular cross-section having their longitudinal axes inclined to the longitudinal axis of said inset, thereby passing through both end surfaces of said inset in a penetration ellipse, the longer axes of said penetration ellipses in said other end surface of said inset being substantially parallel to one another and their shorter axes being in substantial alignment one with the other.

3. A volume flow sensor according to claim 2 in which the longer axes of said penetration ellipses in said one end surface of said inset are in substantial alignment one with the other.

4. A volume flow sensor according to claim 1 in which each of said poles comprises a plurality of pole elements in magnetically-conducting connection one with another.

5. A volume flow sensor according to claim 4 in which each pole comprises a first pole element in the form of a pin which is arranged in a bore extending within the inset and at its outer end passes through said other end surface of said inset obliquely to the longitudinal axis of said inset to form a penetration ellipse in said other end surface, the two penetration ellipses formed in said other end surface by said oblique bores having their longer axes substantially parallel with one another and their shorter axes in substantial alignment, and a second pole element in the form of a pin in a bore extending in said inset from said one end surface of said inset to the corresponding said oblique bore in a direction substantially perpendicular to said one end surface of said inset, said second pole elements being substantially symmetrical with respect to said longitudinal axis of said inset and each said second pole element making a magnetically-conducting connection with the respective said first pole element.

6. A volume flow sensor according to claim 4 in which each pole comprises a first pole element in the form of a pin which extends through a first bore in said inset in a direction parallel to the end surfaces of said inset, a second pole element also in the form of a pin extending in a second bore in said inset from said one end surface of said inset substantially perpendicularly to said one end surface and engaging the respective first pole element, said second pole elements being substantially symmetrical with respect to the longitudinal axis of said inset, and a third pole element extending in said inset from said other end surface of said inset substantially perpendicularly to said other end surface and also engaging the respective first pole element, each respective said second and third pole elements making magnetically-conducting connections with the respective said first pole element.

7. A volume flow sensor according to claim 6 in which each said third pole element is in the form of a pin arranged in a bore extending from said other end surface and penetrating the respective said first pole element.

8. A volume flow sensor according to claim 6 in which said other end surface of said inset contains a sunk bore in a central region thereof extending to both said first bores in which said first pole elements are located and said third pole elements each have a substantially rectangular cross-section and are positioned adjacent each other side-by-side, but separated one from the other by a non-magnetic intermediate layer in said sunk bore and each making a magnetically-conducting connection with the respective said first pole element.

* * * * *